United States Patent
Saito

(10) Patent No.: US 8,218,166 B2
(45) Date of Patent: Jul. 10, 2012

(54) PRINT PROCESSING SYSTEM AND PRINT PROCESSING METHOD

(75) Inventor: Megumi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 12/252,245

(22) Filed: Oct. 15, 2008

(65) Prior Publication Data

US 2009/0097053 A1    Apr. 16, 2009

(30) Foreign Application Priority Data

Oct. 16, 2007    (JP) ................................. 2007-269346

(51) Int. Cl.
*G06K 15/00*    (2006.01)

(52) U.S. Cl. ...................................... 358/1.14; 358/1.15

(58) Field of Classification Search ........................ None
See application file for complete search history.

(56) References Cited

U.S. PATENT DOCUMENTS

| 7,518,746 | B2 * | 4/2009 | Leiman et al. ............... 358/1.15 |
| 2004/0193678 | A1 | 9/2004 | Trufinescu |
| 2007/0086049 | A1 * | 4/2007 | Lee et al. ..................... 358/1.15 |
| 2008/0263675 | A1 * | 10/2008 | McIntyre ........................ 726/28 |

FOREIGN PATENT DOCUMENTS

JP    2004-310745    11/2004

* cited by examiner

*Primary Examiner* — Dov Popovici
*Assistant Examiner* — John Wallace
(74) *Attorney, Agent, or Firm* — Canon U.S.A., Inc., IP Division

(57) ABSTRACT

At the time of processing on print data created by a client computer, in a case where a server computer obtains information that should be notified to the client computer, the server computer adds a message to the print data to be sent to a device. In a case where the print data is added with the message, the device creates the message to be sent to the server computer. The server computer sends the message to the client computer. The client computer displays an image based on the message.

6 Claims, 9 Drawing Sheets

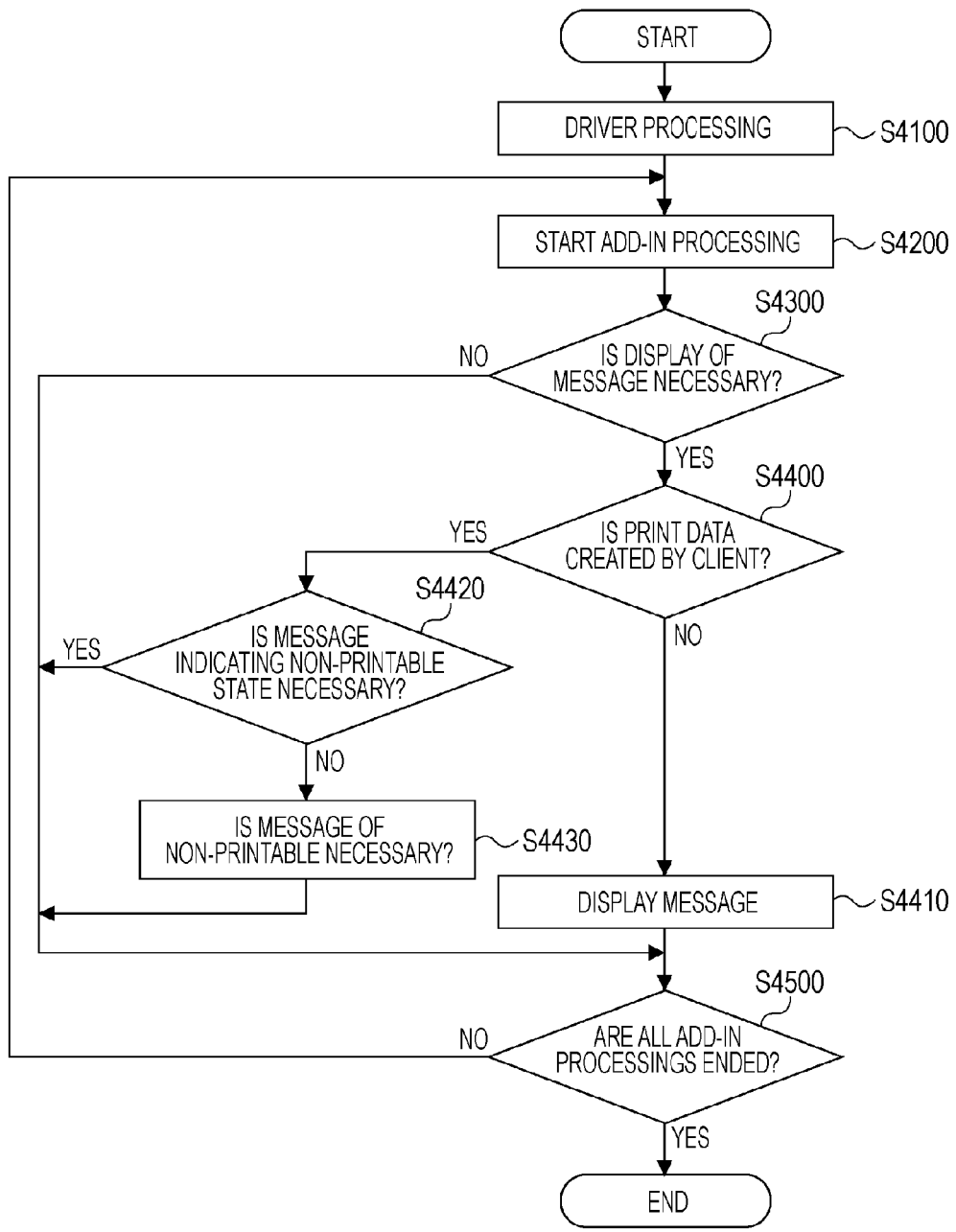

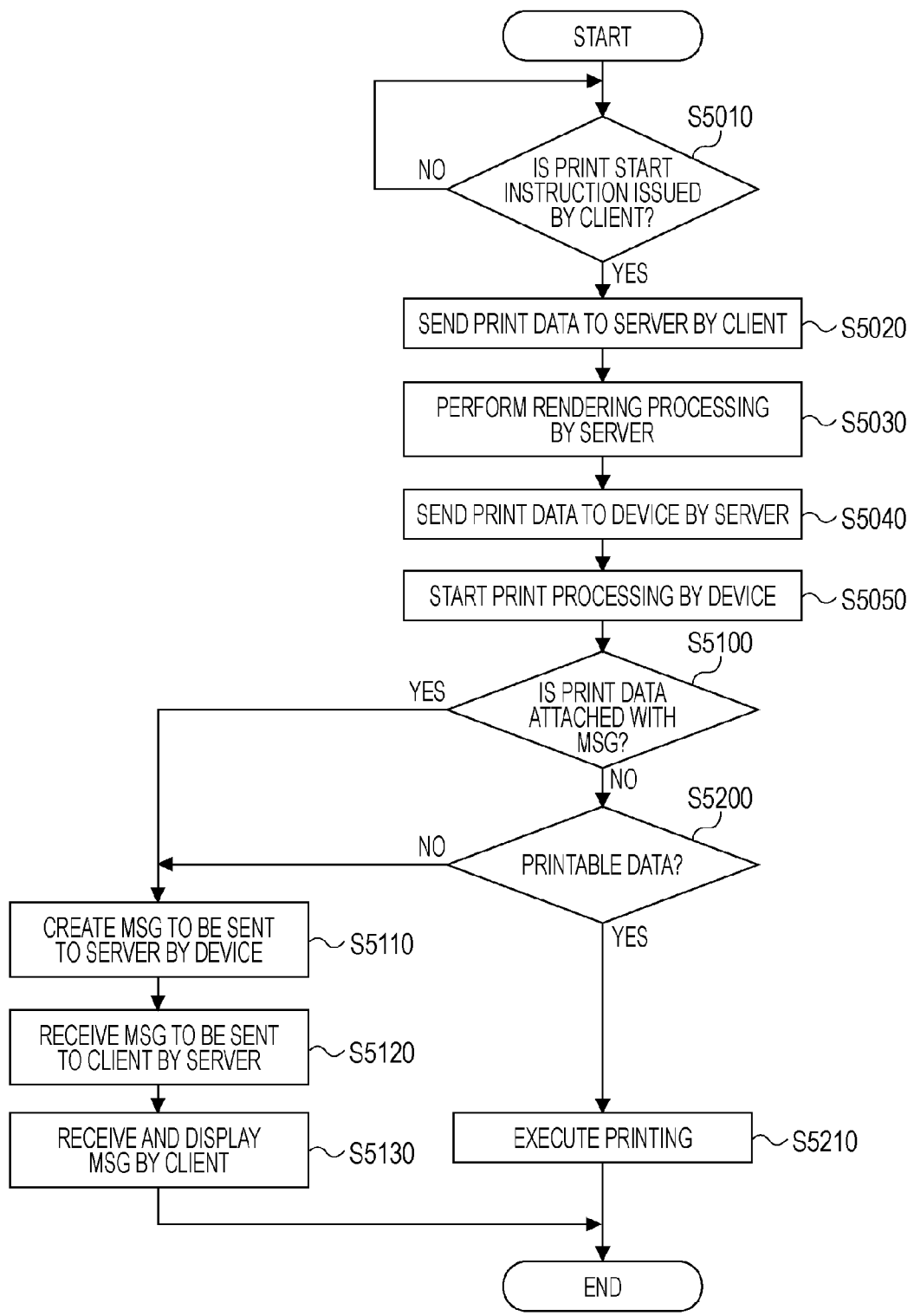

```
<soapenv:Envelope xmlns:soapenv="http://schemas.xmlsoap.org/soap/envelope/">
<soapenv:Header>
<n:MsgHeader xmlns:n="172.24.11.1">
<n:JobMessageId>id:12oe32923-3598E9s29</n:JobId>
</n:MsgHeader>
</soapenv:Header><SOAP-ENV:Body>
<tns:MessageString>
<inputString>Warning: PRINTED THROUGH DUPLEX PRINTING </inputString>
</tns:MessageString>
</SOAP-ENV:Body>
</SOAP-ENV:Envelope>
```

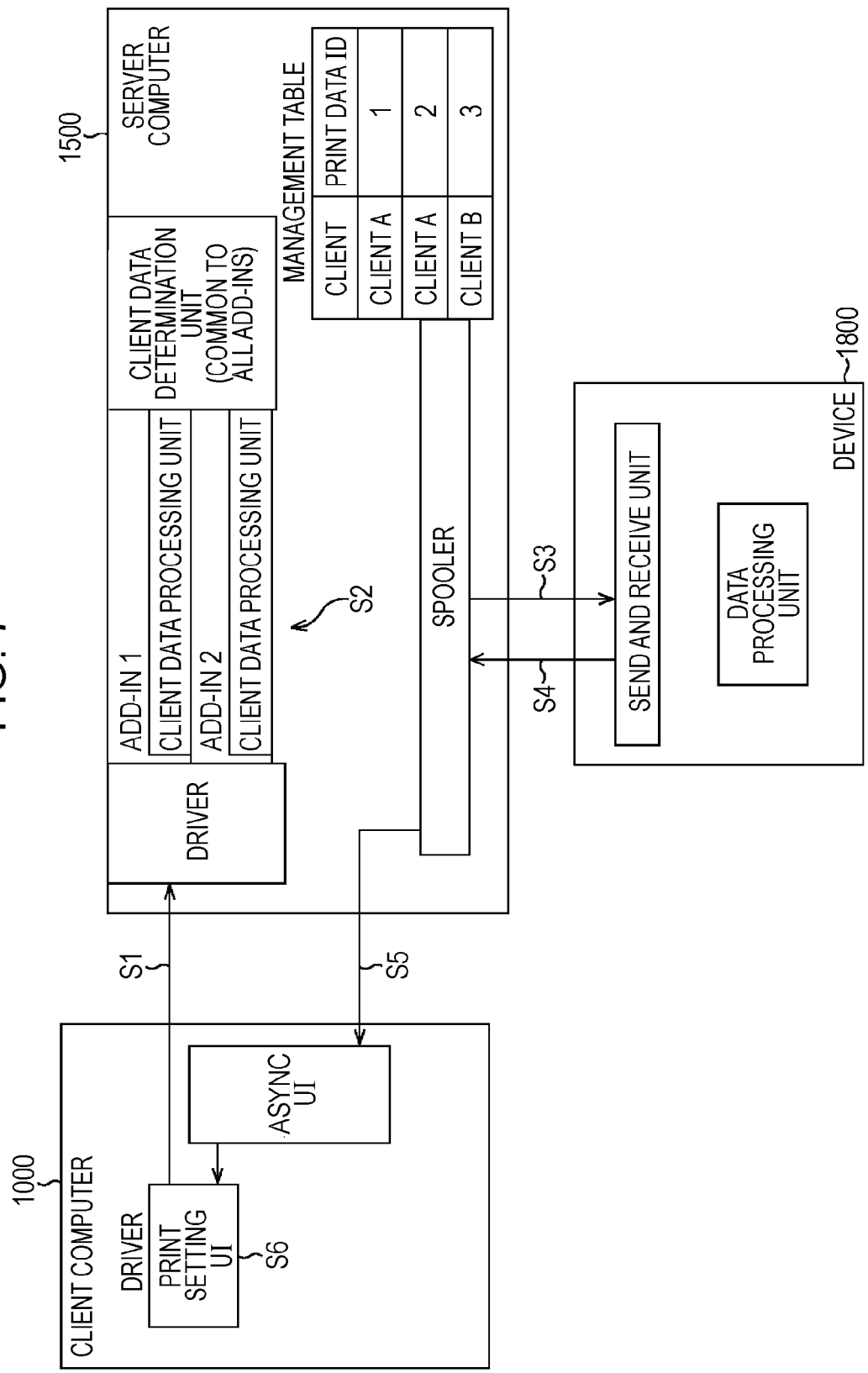

```
<soapenv:Envelope xmlns:soapenv="http://schemas.xmlsoap.org/soap/envelope/">
<soapenv:Header>
<n:MsgHeader xmlns:n="172.24.11.1">
<n:JobMessageId>id:12oe32923-3598E9s29</n:JobId>
</n:MsgHeader>
</soapenv:Header><SOAP-ENV:Body>
<tns:MessageString>
<inputString> Error:Could not verify the ID and password.</inputString>
<Item:ID/>
<Item:Password/>
</tns:MessageString>
</SOAP-ENV:Body>
</SOAP-ENV:Envelope>
```

PRINT PROCESSING SYSTEM AND PRINT PROCESSING METHOD

BACKGROUND OF THE INVENTION

1. Field of the Invention

The present invention relates to a print processing system and a print processing method which are suitably used for performing printing on the basis of print data generated while a server and a client work in collaboration with each other.

2. Description of the Related Art

Many systems perform printing by using a network that constitutes a server client environment. According to a print system in the server client environment, a server is connected to a printer, and a printer driver is installed to create a print environment. A client accesses the server to be connected to the printer which is made public by the server. At this time, the client sees only the server and does not perform a direct communication with the printer. A printer driver of the client uses a "driver set for client" which is registered in the printer driver of the server. Therefore, a consistency between the printer driver of the server and the printer driver of the client is ensured. When an OS (Operating System) of the server is the same as an OS of the client, the same printer driver is installed to the client as that to the server.

In the server client environment, it is possible to perform printing through a server rendering in which data conversion for the printer after print setting is performed in the server (refer to Japanese Patent Laid-Open No. 2004-310745). In the server rendering, it is possible to leave a part of a processing at the time of printing on the server, and therefore it is possible to finish the printing for a short period of time for the client. Also, in the server rendering, by improving a performance of the server, it is possible to shorten the time until the print end. In other words, in an environment where a large number of clients are present, it is possible to increase the printing speed with a small amount of cost.

As a method of displaying information on a display device of the client in the server client environment, the following method is common. First, clients are registered as listeners in a server in advance. Then, the server determines an appropriate client from sender information sent from a common resource and listener registration information and sends information to the client so that the information is displayed on a display device of the client (Japanese Patent Laid-Open No. 2004-310745).

However, according to the related art described above, only a relevance between the sender and the client is considered, and information transmission cannot identify a necessary client in accordance with a situation and the information cannot be only sent to a client who needs the information transmission.

In addition, according to the related art described above, the consistency between the printer driver of the server and the printer driver of the client is ensured even when the printer driver is updated, and the printer driver of the server and the printer driver of the client work in collaboration with each other to perform a processing on the print data. However, the technology described according to the related art described above is not a mechanism for transmitting information such as a processing status from the server to the client, and information such as an error is displayed on a display apparatus of a computer where the processing is performed. For example, even when the processing on the print data which is generated in the client by the user is stopped at the server, display of the error indicating the above-described situation is not performed by a display apparatus of the client but is performed by a display apparatus of the server. For that reason, the user cannot appropriately receive information necessary to the user himself/herself, which becomes burdensome for the user.

SUMMARY OF THE INVENTION

The present invention has been made in view of the above-described problems and the invention provides a print processing system, a print processing method, and a computer program in which when printing on the basis of print data generated while a server and a client work in collaboration with each other, it is possible to notify a user of the client of information related to the user.

According to an embodiment of the present invention, there is provided a print processing system, including a server apparatus which includes a conversion unit configured to convert print data sent from a client terminal apparatus into print data which can be processed by a print apparatus, and a first sending unit configured to send the print data converted by the conversion unit to the print apparatus and send the print data in which an error is detected by the print apparatus to the print apparatus in a case where a message to a user is necessary; and a print apparatus which includes an execution unit configured to execute printing based on the print data sent by the first sending unit, a generation unit configured to generate data for notifying the client terminal apparatus of a message in a case where the error is detected based on the print data, and a second sending unit configured to send the data generated by the generation unit to the server apparatus so as to allow the data to be sent to the client terminal apparatus.

According to another embodiment of the present invention, there is provided a server apparatus including: a conversion unit configured to convert print data sent from a client terminal apparatus into print data which can be processed by a print apparatus; and a sending unit configured to send the print data converted by the conversion unit to the print apparatus and send print data in which an error is detected by the print apparatus to the print apparatus in a case where a message to a user is necessary.

According to another embodiment of the present invention, there is provided a print processing method, including converting print data sent from a client terminal apparatus into print data which can be processed by a print apparatus; sending the converted print data to the print apparatus and sending print data in which an error is detected by the print apparatus to the print apparatus in a case where a message to a user is necessary; executing printing based on the sent print data; generating data for notifying the client terminal apparatus of a message in a case where the error is detected based on the print data; and sending the generated data to the server apparatus so as to allow the data to be sent to the client terminal apparatus.

According to another embodiment of the present invention, there is provided a computer-storage medium encoded with a computer-executable program which instructs a computer to execute a method for print processing, the method includes converting print data sent from a client terminal apparatus into print data which can be processed by a print apparatus; and sending the converted print data to the print apparatus and sending print data in which an error is detected by the print apparatus to the print apparatus in a case where a message to a user is necessary; executing printing based on the sent print data; generating data for notifying the client terminal apparatus of a message in a case where the error is detected based on the print data; and sending the generated data to the server apparatus so as to allow the data to be sent to the client terminal apparatus.

Further features and aspects of the present invention will become apparent from the following description of exemplary embodiments with reference to the attached drawings.

BRIEF DESCRIPTION OF THE DRAWINGS

FIG. 4 is a flowchart for describing a rendering processing example which is performed by a server computer according to the first embodiment of the present invention.

FIG. 5 is a flowchart for describing an operation example of the entire print processing system according to the first embodiment of the present invention.

FIG. 6 illustrates an MSG example which is sent from a device to the server computer according to the first embodiment of the present invention.

FIG. 7 illustrates a functional configuration example of the print processing system according to the first embodiment of the present invention.

FIG. 9 illustrates an MSG example which is sent from the device to the server computer according to the second embodiment of the present invention.

DESCRIPTION OF THE EMBODIMENTS

First Embodiment

Figure 1:
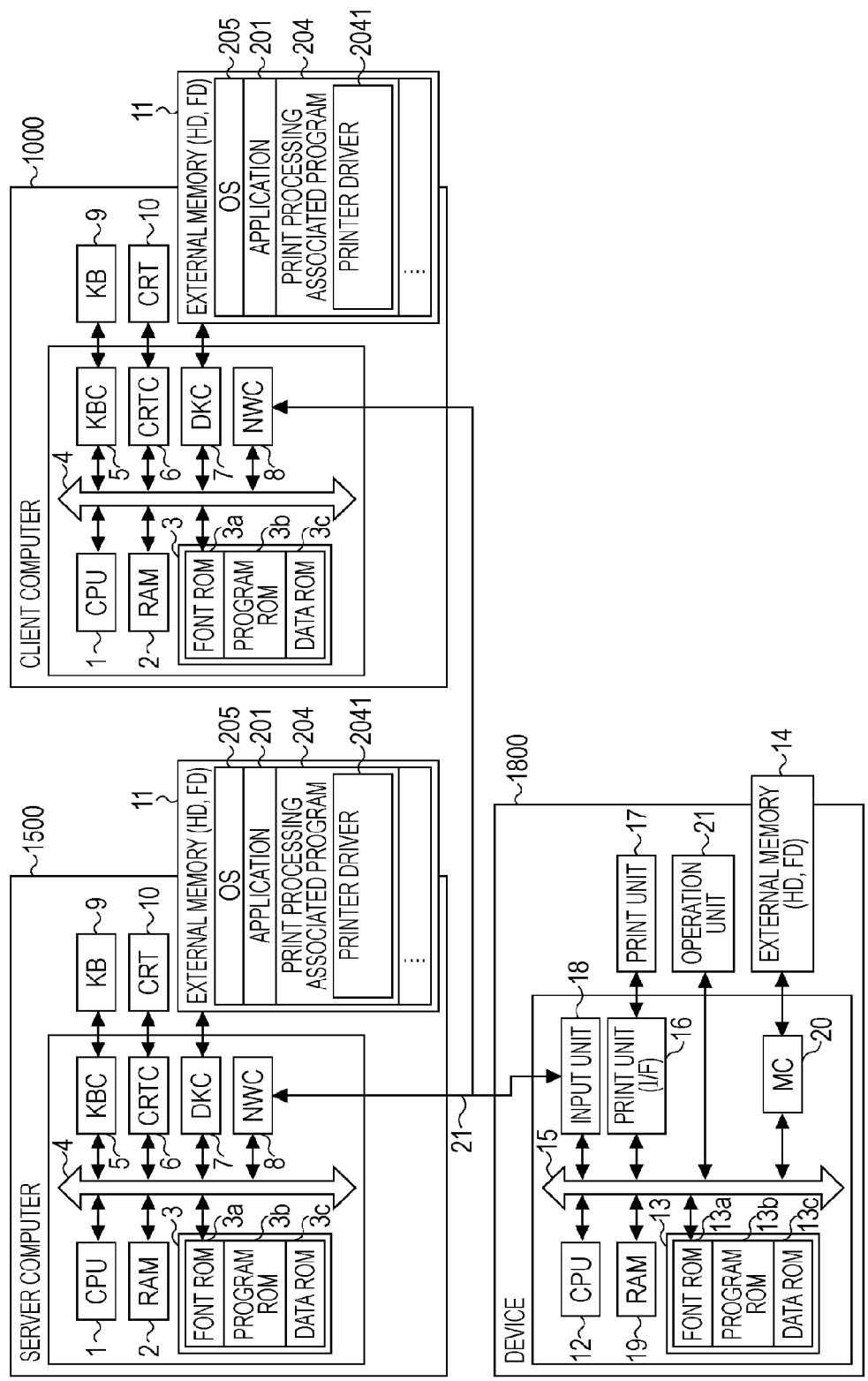
FIG. 1 is a block diagram of a configuration example of a print processing system according to a first embodiment of the present invention.

Hereinafter, with reference to the drawings, a first embodiment of the present invention will be described. FIG. 1 is a block diagram of a configuration example of a print processing system. This print processing system is composed of a client computer 1000 which is an example of a client terminal apparatus, a server computer 1500 which is an example of a server apparatus, and a device 1800 which is configured to receive print data from the server computer 1500 and perform a print.

In the client computer 1000 and the server computer 1500, in accordance with a program stored in a RAM 2, a CPU 1 controls the respective devices connected to a system bus 4. The RAM 2 also functions as a main memory, a work area, and the like of the CPU 1. A ROM 3 stores various programs and data and is composed by being divided into a font ROM 3a, a program ROM 3b storing a boot program, BIOS, and the like, and a data ROM 3c storing various pieces of data.

A keyboard controller (KBC) 5 controls a key input from a keyboard (KB) 9 or a pointing device (mouse) which is not shown. A CRT controller (CRTC) 6 controls display on a CRT display (CRT) 10. A disk controller (DKC) 7 controls an access to an external memory 11 such as a hard disk drive.

In the client computer 1000, a network controller (NWC) 8 is connected via a bidirectional interface to the server computer 1500, and performs a communication control processing with the server computer 1500.

In the server computer 1500, the network controller (NWC) 8 is connected via the bidirectional interface to the client computer 1000 and the device 1800, and performs the communication control processing.

The external memory 11 is composed, for example, of the hard disk drive (HD), the DVD, the flexible disk (FD), or the like. The external memory 11 stores, as illustrated in the drawing, various applications 201 such as an operation system (hereinafter, referred to as OS) 205 and a print processing associated program 204 as well as a user file, an edited file, and the like. An example of the various applications 201 includes a document processing application program for performing a processing on a document in which a figure, an image, a character, a table, and the like are mixed. The print processing associated program 204 is a program for generating print data which is described by using a page description language, and may be commonly used by a plurality of devices in the same line.

The application 201 stored in the external memory 11 is loaded to the RAM 2 and executed by the CPU 1. Also, the CPU 1 executes, for example, an expanding (rasterizing) processing of an outline font to the RAM 2 to enable WYSIWTG (What You See Is What You Get) on the CRT 10. Furthermore, based on a command instructed by a mouse cursor or the like (not shown) on the CRT 10, the CPU 1 opens various registered windows to execute various data processings. When the user execute the printing, the user opens a setting screen for a print setting so that it is possible to perform settings for the print processing with respect to a printer driver 2041 including a device setting and a selection of a print mode. The client computer 1000 is often inferior to the server computer 1500 in processing performance, and a rendering processing at the time of the printing is performed by the server computer 1500.

In the device 1800, a CPU 12 controls the respective devices connected to a system bus 15 in accordance with a program stored in a RAM 19. The RAM 19 also functions as a main memory, a work area, and the like of the CPU 12. A ROM 13 stores various programs and data and is composed by being classified into a font ROM 13a, a program ROM 13b storing a boot program, BIOS, and the like, and a data ROM 13c storing various pieces of data.

An operation unit 21 is used by the user of the device 1800 to perform various settings. An input unit 18 is connected via the bidirectional interface to the server computer 1500, and performs the communication control processing with the server computer 1500. An external memory 14 is composed, for example, of the hard disk drive (HD), the DVD, the flexible disk (FD), or the like. An access to the external memory 14 is controlled by a memory controller (MC) 20.

A print unit 17 is provided with a printer engine for forming an image on a sheet based on data input via a print unit I/F 16.

According to the present embodiment as described above, the case in which the device 1800 is the printer has been described as an example. However, the device 1800 is not limited to the printer and may be a multi function peripheral or the like.

Figure 2:
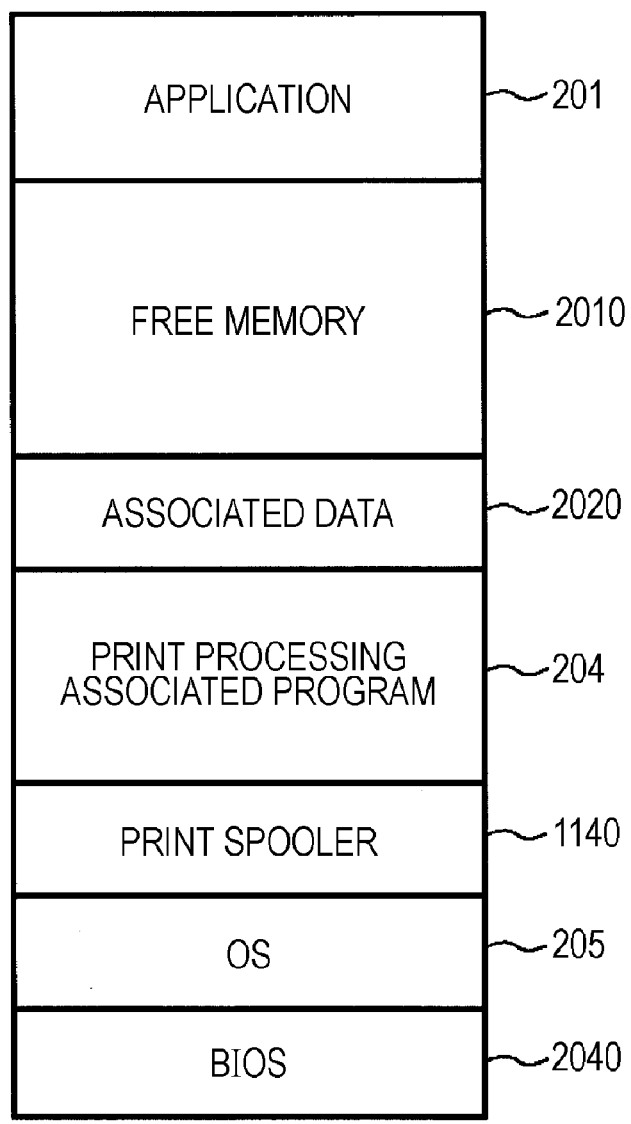
FIG. 2 illustrates a memory map example of a RAM according to the first embodiment of the present invention.

FIG. 2 illustrates an exemplary memory map of the RAM 2 in a state where the predetermined application 201 and the print processing associated program 204 are activated and the program and the data are loaded onto the RAM 2 of the client computer 1000 or the server computer 1500. As illustrated in the drawing, a BIOS 2040 and the OS 205 as well as the application 201, the print processing associated program 204, a print spooler 1140 and associated data 2020 are loaded onto the RAM 2. Furthermore, a free memory 2010 is also ensured in the RAM 2. With this configuration, such a state is established that the application 201 and the print processing associated program 204 can be executed.

Figure 3:
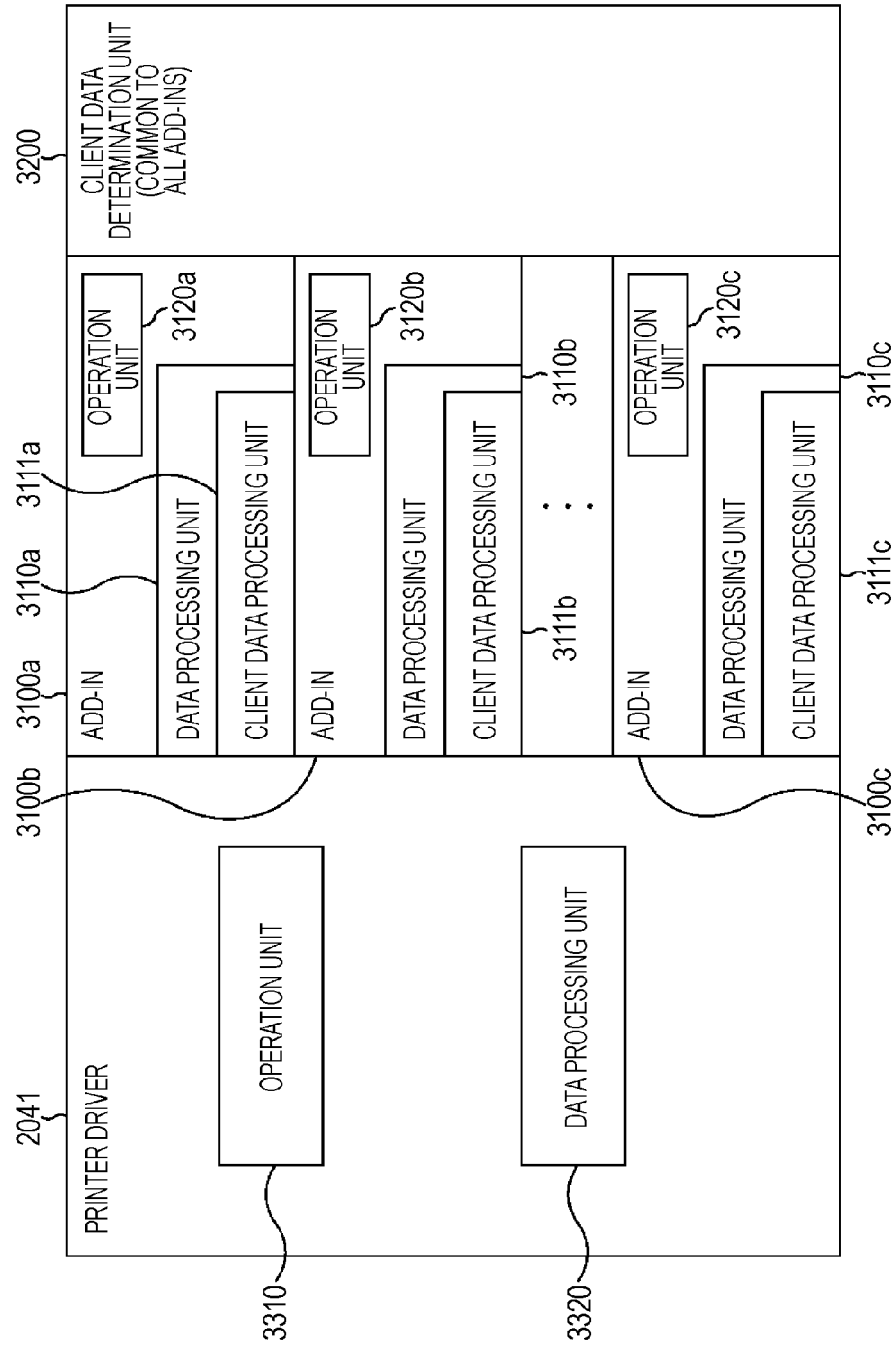
FIG. 3 is a block diagram of a configuration example of a print processing associated program according to the first embodiment of the present invention.

FIG. 3 is a block diagram of a configuration example of the print processing associated program 204.

The print processing associated program 204 includes the printer driver 2041, an Add-in 3100, and a client data determination unit (common for all the Add-ins) 3200.

The Add-in 3100 includes a data processing unit 3110. The data processing unit 3110 includes a client data processing unit 3111. The client data processing unit 3111 is configured to perform a processing only on the data determined as the client data by the client data determination unit 3200.

The print processing associated program 204 has the same configuration in the server computer 1500 and the client computer 1000 too. In a case where the rendering processing is performed by the server computer 1500 (in the case of server rendering), the client computer 1000 sets the printer driver 2041 by using an operation unit 3310 and also sets methods for printing and an Add-in processing by using operation units 3120a-c of the Add-in 3100a-c. In accordance with a print start instruction, the print data is transferred from the application 201 to the printer driver 2041. The printer driver 2041 sends the received data and the set processing methods to the server computer 1500. At this time, the data sent from the client computer 1000 to the server computer 1500 is data received from the application 201 as it is. For this reason, the device 1800 cannot process the data and the printing is not realized in the settings specified by the user. In view of the above, when the server computer 1500 receives the data, the server computer 1500 starts the rendering processing.

FIG. 4 is a flowchart for describing the rendering processing example performed in the server computer 1500.

First, in step S4100, when the server computer 1500 receives the data from the client computer 1000, the server computer 1500 performs a driver processing which is a basic print process. The driver processing is a processing for converting the print data into a format which can be processed by the printer driver 2041 in a data processing unit 3320 of the printer driver 2041. At this time, a processing for performing a minute adjustment on printing colors and a processing for changing a print magnification ratio may also be performed in some cases.

Next, in step S4200, the server computer 1500 starts the Add-in processing on the print data subjected to the driver processing in step S4100. In the Add-in processing, a processing of the function of the Add-in 3100 is performed. For example, a processing of adding a background pattern for preventing a copy is performed.

Next, in step S4300, the server computer 1500 determines whether timely display of a message (hereinafter, referred to as MSG when necessary) is necessary during execution of the Add-in processing. The determination as to whether the MSG is necessary uses a determination criterion, for example, as to whether information that should be notified to the user can be obtained in a certain Add-in processing. The representative information that should be notified to the user is information related to the error such as "the setting is changed from the setting specified by the user", "the setting specified by the user is inconsistent and printing cannot be performed", or "the print data does not allow printing".

As a result of this determination, in a case where it is determined that the MSG is not necessary, the processing is advanced to step S4500, and the server computer 1500 determines whether all the Add-in processings are ended. As a result of this determination, in a case where all the Add-in processings are not ended, the processing is advanced to step S4200, and until all the Add-in processings are ended, the processing in steps S4200 to 4500 is repeatedly performed. Then, when all the Add-in processings are ended, the rendering processing of the server computer 1500 is ended.

On the other hand, in a case where it is determined that the MSG is necessary, the processing is advanced to step S4400. When the processing is advanced to step S4400, the server computer 1500 determines whether the print data currently processed is the data created by the client computer 1000. For example, information on the computer which created the data (a name, or the like) is input to the print data, and in a case where the information of the print data is different from the information of the computer which is currently processing, it is possible to determine that the print data is the data created by the client computer 1000.

As a result of this determination, in a case where the print data is not the data created by the client computer 1000, the processing is advanced to step S4410. When the processing is advanced to step S4410, the server computer 1500 display a MSG to the user on the CRT 10 provided to the server computer 1500. Then, the processing is advanced to step S4500 described above, and the server computer 1500 determines whether all the Add-in processings are ended.

On the other hand, in a case where the print data is the data created by the client computer 1000, the processing is advanced to step S4420. When the processing is advanced to step S4420, the server computer 1500 determines whether display of the MSG of the non-printable state is necessary (that is, the server computer 1500 determines whether display of the MSG indicating a state in which the printing cannot be performed by the device 1800 is necessary). As a result of this determination, in a case where the display of the MSG of the non-printable state is necessary, while the print data contains the error so that the device 1800 can detect the error, the processing is advanced to step S4500 as described above. Then, the server computer 1500 determines whether all the Add-in processings are ended.

On the other hand, in a case where the display of the MSG of the non-printable state is not necessary, for example, in a case where the information is wished to be notified to the user, the processing is advanced to step S4430. When the processing is advanced to step S4430, the server computer 1500 generates the MSG and adds data including the generated MSG and the data including the error to the print data. The addition of the MSG can be realized, for example, by specifying a MSG code and a MSG character string at a part of the MSG command and adding the MSG command in which the MSG code and the MSG character string are specified to the print data. A specific example will be described. When "the print setting is changed to duplex printing" is wished to be notified, "printed through duplex printing (setting change)" is input to the MSG command. If the MSG code for the change in the print setting is defined as "13129: Keyword", "13129: duplex printing" is specified in the MSG command. Such an MSG is described, for example, in XML format. Also, in step S4430, the data containing the error is added to the print data so that the device 1800 can detect the error. For example, such data that rendering becomes invalid in which the print apparatus is not stopped is added instead of such data that an error occurs due to running out of sheets.

Then, the processing is advanced to step S4500 as described above, and the server computer 1500 determines whether all the Add-in processings are ended.

FIG. 5 is a flowchart for describing an operation example of the entire print processing system.

First, in step S5010, the client computer 1000 stands by until the user issues a print start instruction. When the print start instruction is issued, the processing is advanced to step S5020. When the processing is advanced to step S5020, the printer driver 2041 of the client computer 1000 sends the print data received from the application 201 to the server computer 1500 through the spooler. At this time, the content of the print data is not changed as being received from the application 201, and the content is not converted into the format which the device 1800 can understand. In view of the above, in step S5030, the server computer 1500 performs the rendering processing when the print data is received. The detail of the rendering processing is the same as described above.

When the rendering processing performed by the server computer 1500 is ended, in step S5040, the spooler of the server computer 1500 sends the print data which is converted into the format that can be processed by the device 1800 to the device 1800. At that time, an ID of the print data is added to a column corresponding to a correspondence table which indicates a corresponding relation between the client computer 1000 and the ID of the print data.

It is noted that the flowchart described in FIG. 4 is realized, for example, during the processing between step S5030 and step S5040. Also, in a case where the MSG which is an example of the message data is generated, the print data to which the MSG is added is sent from the server computer 1500 to the device 1800.

As described above, at least due to the technology described in step S5040, the first sending unit and the third sending unit are realized.

Next, in step S5050, when the device 1800 receives print data, the print processing is started.

In the print processing of the device 1800, first, in step S5100, the device 1800 determines whether an MSG is attached to the received print data. As a result of this determination, in a case where the MSG is attached to the received print data, it is determined that the printing cannot be performed and it is necessary to send the MSG to the client computer 1000, and the processing is advanced to step S5110. When the processing is advanced to step S5110, the device 1800 creates an MSG to be sent to the server computer 1500. The MSG created at this time will be described below by using FIG. 6.

As described above, at least due to the technology described in step S5110, the second sending unit is realized.

Next, in step S5120, when the spooler of the server computer 1500 receives the MSG, the spooler checks to which print data the MSG relates and sends the MSG to an appropriate client computer 1000.

Next, in step S5130, when the client computer 1000 receives the MSG, the content of the MSG is displayed on the display screen of the CRT 10 provided to the client computer 1000.

Also, in step S5100, after determining whether the MSG is attached to the received print data, in step S5200, the device 1800 determines whether all the received pieces of print data are printable data. For example, as the result of the print processing in the device 1800, in a case where the error is not generated, it is possible to determine that all the received pieces of print data are printable data. As a result of this determination, in a case where the received print data is not printable data (in a case where the data contains the error), the processing is advanced to step S5110. In this case, in step S5110, the device 1800 creates an MSG including an ID of the print data indicating "printing cannot be performed" and sends the MSG to the server computer 1500. Then, in step S5120, when the spooler of the server computer 1500 receives the MSG, the spooler checks to which print data the MSG relates and sends the MSG to an appropriate client. To be more specific, as the client computer 1000 and the ID of the print data are managed by the correspondence table, on the basis of the ID of the print data included in the MSG and the correspondence table, the client computer 1000 is identified and the MSG is sent. Then, in step S5130, when the client computer 1000 receives the MSG, the content of the MSG is displayed on the display screen of the CRT 10 provided to the client computer 1000.

On the other hand, in step S5200, when it is determined that the received print data is printable data, the processing is advanced to step S5210. When the processing is advanced to step S5210, the device 1800 executes the printing based on the received print data.

FIG. 6 illustrates an MSG example sent from the device 1800 to the server computer 1500.

As illustrated in FIG. 6, in a header of an MSG 600 sent from the device 1800 to the server computer 1500, an address of the MSG and an ID with which the print data can be identified are described. Also, in a main body of the MSG 600, information wished to be transferred from the device 1800 to the server computer 1500 or the client computer 1000 is described.

According to the present embodiment as described above, at the time of the print data processing, the server computer 1500 determines whether the information that should be notified to the user of the client computer 1000 is obtained. In a case where the information that should be notified is obtained, the server computer 1500 determines whether the print data is data created by the client computer 1000. In a case where the print data is data created by the client computer 1000, the server computer 1500 adds the MSG to the print data and sends the data to the device 1800. In a case where the MSG is added to the print data, the device 1800 creates the MSG to be sent to the server computer 1500, and the server computer 1500 sends the MSG to the client computer 1000. The client computer 1000 displays an image based on the MSG. Therefore, when the printing instructed from the client computer 1000 is worked by the server computer 1500 and the device 1800 in collaboration with each other, it is possible to notify the user of the client computer 1000 of the information related to the printing. That is, the information that should be notified to the user at the time of printing can be displayed on the client computer 1000 which is operated by the user, and the usability can be improved for the user.

FIG. 7 illustrates a functional configuration example of the print processing system. With reference to FIG. 7, an outline of an operation of the print processing system according to the present embodiment will be collectively illustrated.

In step S1: the driver of the client computer 1000 sends the print data to the server.

In step S2: in a case where the print result becomes different from the user setting and it is necessary to inform the client computer 1000 of this situation, the driver of the server computer 1500 adds the data in which the error is caused in the device 1800 to the print data.

In step S3: the spooler of the server computer 1500 sends the information for identifying the client computer 1000 and the print data and the data in which the error is caused in the device 1800 to the device 1800. Also, the spooler of the server computer 1500 adds the ID of the print data to be sent to a column corresponding to the client of the management table.

In step S4: in a case where the error is caused when the print processing is performed based on the print data, the device 1800 carries out the following processing. That is, the device 1800 sends the MSG information including the information for identifying the client computer 1000 and the print data to the server computer 1500 by utilizing a system of WSD (Web Services on Devices).

In step S5: based on the information for identifying the client computer 1000 and the print data included in the MSG information and the management table, the spooler of the server computer 1500 identifies the client computer 1000. Then, the spooler of the server computer 1500 sends the MSG information to the identified client computer 1000.

In step S6: the driver of the client computer 1000 displays the message based on the MSG information sent from the server computer 1500 and obtained via an Async UI.

It is noted that according to the present embodiment, in step S4420, in a case where display of the MSG of non-printable state is not necessary, the processing is advanced to step S4430, and the MSG is added to the print data. However, other configurations may be adopted. For example, in step S4400, when it is determined that the currently processed print data is data created by the client computer 1000, the processing in step S4420 is not performed and the MSG may be added to the print data. In such a case, the MSG of non-printable state is added to the print data.

Also, according to the present embodiment, the print data to which the MSG is added is sent from the server computer 1500 to the device 1800, but the MSG and the print data may be individually sent.

Second Embodiment

Next, a second embodiment of the present invention will be described. According to the first embodiment described above, regarding the print data in which it is determined that the printing cannot be performed (determined as No in step S5200), the printing is not executed. In contrast to this, according to the present embodiment, even for the print data in which it is determined that the printing cannot be performed, the printing is performed in the same print flow. That is, according to the first embodiment, in a case where the MSG delivered to the client computer 1000 which is performed by the user is "the printing cannot be performed", it is necessary for the user of the client computer 1000 to instruct the printing again. In contrast to this, according to the present embodiment, as will be described below, additional data for enabling printing is created and this additional data is synthesized with the print data processed as non-printable. With this configuration, the client computer 1000 does not need to perform the print instruction from the beginning. In this manner, the present embodiment and the first embodiment described above are mainly different in a part of the processing at the time of printing. Therefore, in a description according to the present embodiment, the same parts as those according to the first embodiment described above are denoted by the same reference numerals used in FIGS. 1 to 7, for example, and a detailed description will be omitted.

Figure 8:
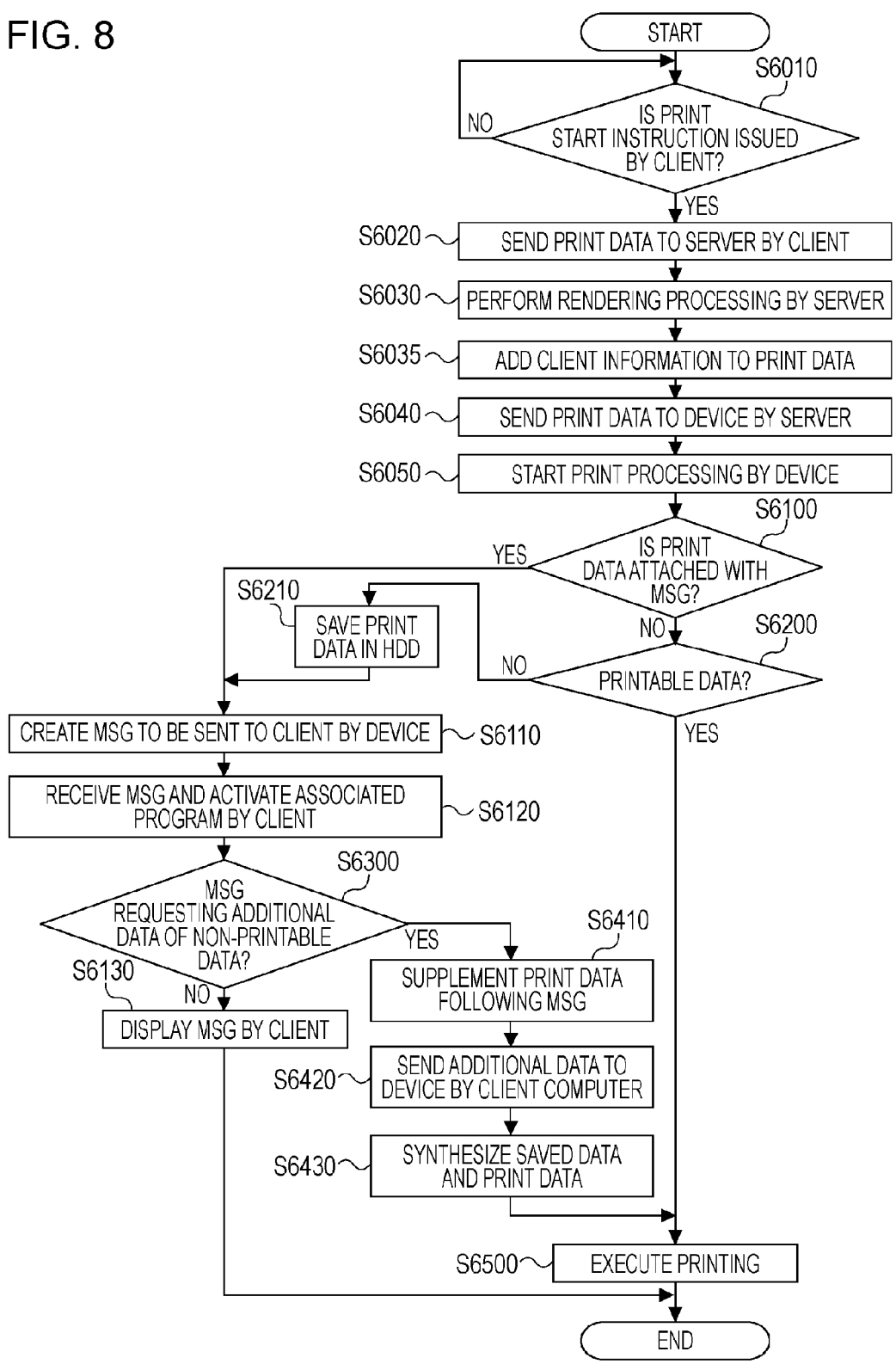
FIG. 8 is a flowchart for describing an operation example of the entire print processing system according to a second embodiment of the present invention.

FIG. 8 is a flowchart for describing an operation example of the entire print processing system. First, in step S6010, the client computer 1000 stands by until the user issues a print start instruction. When the print start instruction is issued, the processing is advanced to step S6020. When the processing is advanced to step S6020, the printer driver 2041 of the client computer 1000 sends the print data received from the application 201 to the server computer 1500 through the spooler. At this time, the content of the print data is the data received from the application 201 as it is, and is not converted into a format which the device 1800 can understand. In view of the above, in step S6030, the server computer 1500 performs the rendering processing when the print data is received. The detail of the rendering processing is the same as that described according to the first embodiment.

When the rendering processing performed by the server computer 1500 is ended, the processing is advanced to step S6035. When the processing is advanced to step S6035, the server computer 1500 adds information for identifying the client computer 1000 (hereinafter, referred to as client information) to the print data converted into the format that can be processed by the device 1800. With this client information, the device 1800 and the like can identify from which client computer 1000 the print data is created.

In the above-described manner, when the processing on the print data in the server computer 1500 is ended, in step S6040, the spooler of the server computer 1500 sends the print data to the device 1800.

It is noted that the flowchart described in FIG. 4 is executed, for example, during the processing in steps S6030, S6035, and S6040. Also, in a case where the MSG is generated, the print data to which the MSG is added is sent from the server computer 1500 to the device 1800.

As described above, at least due to the technology described in step S6040, the first sending unit and the third sending unit are realized.

Next, in step S6050, when the device 1800 receives print data, the print processing is started.

In the print processing of the device 1800, first, in step S6100, the device 1800 determines whether an MSG is attached to the received print data. As a result of this determination, in a case where the MSG is attached to the received print data, the processing is advanced to step S6110, and the device 1800 creates the MSG to be sent to the client computer 1000. The MSG created at this time will be described below by using FIG. 9.

As described above, at least due to the technology described in step S6110, the second sending unit is realized.

Next, in step S6120, when the client computer 1000 receives the MSG, the client computer 1000 activates a program associated with the MSG. The association between the MSG and the program is performed by utilizing the function of the OS 205 in advance. This association can be performed, for example, by using Async UI of Windows Vista®. The program to be activated herein can instruct displaying the MSG received from the device 1800, receiving an arbitrary input from the user, and sending of the data based on the received input to the device 1800.

The activated program determines, in step S6300, whether the received MSG is the MSG requesting for the additional data which is added to the non-printable print data. As a result of this determination, in a case where the received MSG is not the MSG requesting for the additional data, the processing is advanced to step S6130, and the client computer 1000 displays the content of the MSG on the display screen of the CRT 10 provided to the client computer 1000.

On the other hand, in a case where the received MSG is the MSG requesting for the additional data, the processing is advanced to step S6410. Then, the client computer 1000 displays a GUI for requesting the user to supplement the data which follows the MSG on the display screen of the CRT 10 provided to the client computer 1000. Then, based on the user operation on this GUI, the client computer 1000 supplements the print data which follows the MSG and creates the additional data.

Next, in step S6420, the client computer 1000 sends the additional data to the device 1800.

Next, in step S6430, the device 1800 synthesizes the received additional data with the print data saved in the external memory 14 (the print data sent from the server computer 1500 in step S6040). Then, in step S6500, the device 1800 executes the printing on the basis of the synthesized data.

Also, in step S6100, after determining whether the MSG is attached to the received print data, in step S6200, the device 1800 determines whether all the received pieces of print data are printable data. For example, as the result of the print processing in the device 1800, in a case where the error is not generated, it is possible to determine that all the received pieces of print data are printable data. As a result of this determination, in a case where the received print data is the printable data, the processing is advanced to step S6500, and the device 1800 executes the printing based on the received print data.

On the other hand, in a case where the received print data is not printable data, the processing is advanced to step S6210, and the device 1800 temporarily saves the received print data in the external memory 14. After the saving of the print data, the processing is advanced to step S6110, and the device 1800 creates an MSG to be sent to the server computer 1500.

Next, in step S6120, when the client computer 1000 receives the MSG, the client computer 1000 activates the associated program. The activated program determines, in step S6300, whether the received MSG is the MSG requesting for the additional data which is added to the non-printable print data. As a result of this determination, in a case where the received MSG is not the MSG requesting for the additional data, the processing is advanced to step S6310, and the client computer 1000 displays the content of the MSG on the display screen of the CRT 10 provided to the client computer 1000.

On the other hand, in a case where the received MSG is the MSG requesting for the additional data, the processing is advanced to step S6410. Then, the client computer 1000 displays a GUI for requesting the user to supplement the data which follows the MSG on the display screen of the CRT 10 provided to the client computer 1000. Then, based on the user operation on this GUI, the client computer 1000 supplements the print data which follows the MSG and creates the additional data.

Next, in step S6420, the client computer 1000 sends the additional data to the device 1800.

Next, in step S6430, the device 1800 synthesizes the received additional data with the print data saved in the external memory 14 (the print data temporarily saved in step S6210). Then, in step S6500, the device 1800 executes the printing based on the synthesized data.

FIG. 9 illustrates an MSG example sent from the device 1800 to the server computer 1500.

In FIG. 9, in a header of a MSG 800 sent from the device 1800 to the server computer 1500, an address of the MSG and an ID with which the print data can be identified are described. Also, in a main body of the MSG 800, information which the device 1800 wishes to transfer to the server computer 1500 or the client computer 1000 is described.

According to the present embodiment as described above, in a case where the device 1800 receives the non-printable print data from the server computer 1500, the device 1800 temporarily saves the print data. Then, the device 1800 creates the MSG to be sent to the client computer 1000. The client computer 1000 activates a program previously associated with the received MSG, and determines whether the received MSG urges the user to supplement the temporarily saved print data. Then, in a case where the received MSG urges the user to supplement the temporarily saved print data, the client computer 1000 urges the user to supplement the print data and sends the supplemented content to the device 1800 as the additional data. The device 1800 synthesizes the temporarily saved print data with the additional data and executes the printing on the basis of the synthesized data. Therefore, even in a case where the print data sent from the server computer 1500 to the device 1800 is not the printable data the user of the client computer 1000 does not need to perform the print instruction from the beginning and can execute the printing on the basis of the print data.

Other Embodiments of the Present Invention

The respective units constituting the print processing system and the respective steps of the print processing apparatus according to the above-described embodiments of the present invention can be realized while a program stored in a RAM or a ROM in a computer is operated. This program and a computer-readable recording medium which records the program are included in the present invention.

Also, the present invention can include, for example, embodiments as a system, an apparatus, a method, a program, a storage medium, and the like. To be more specific, the present invention may be applied to a system composed of a plurality of devices and may also be applied to an apparatus composed of a single device.

It is noted that the present invention supplies the program of software which realizes the functions of the above-described embodiments (the program corresponding to the flowcharts illustrated in FIGS. 5 and 7 in the embodiments) to the system or the apparatus directly or remotely. Then, the present invention of course includes a case where the function processing of the above-described embodiments according to the present invention are achieved by reading out and executing the supplied program code by the computer of the system or the apparatus.

Therefore, in order to realize the function processing of the above-described embodiments according to the present invention by the computer, the program code itself inserted into the computer also realizes the functions of the above-described embodiments. In other words, the present invention also includes the computer program itself for realizing the function processing of the above-described embodiments according to the present invention.

In that case, as long as the functions of the program is provided, the mode may also take a program executed by object codes or an interpreter, script data supplied to the OS, and the like.

The storage medium for supplying the program includes, for example, a floppy disk, a hard disk drive, an optical disk, an MO, a CD-ROM, a CD-R, a CD-RW, and the like. The storage medium also includes a magnet tape, a non-volatile memory card, a ROM, a DVD (DVD-ROM, DVD-R) and the like.

In addition to the above, as a method of supplying the program, a connection is made to a homepage of the internet by using a browser of the client computer. Then, by downloading the program itself of the present invention or a file including a compressed automatic installation function from the homepage to the recording medium such as the hard disk drive, it is also possible to supply the program.

Also, it is also possible to supply the program by dividing program codes constituting the program of the present invention into a plurality of files and downloading the respective files from different web sites. In other words, the present invention also includes a WWW server for allowing a plurality of users to download the program files for realizing the function processing of the present invention through the computers.

Also, the program of the present invention is encrypted to be stored in a storage medium such as a CD-ROM and the storage medium is distributed to the user. The user who clears a predetermined condition is allowed to download key information for decrypt the encryption from a web page via the internet. Then, by using the downloaded key information, the encrypted program is executed and installed to the computer to realize the present invention.

In addition, the program read out by the computer is executed to realize the functions of the above-described embodiments. Moreover, an operation system (OS) or the like running on the computer in accordance with an instruction of the program performs a part or all of the actual processing, and the processing also realizes the functions of the above-described embodiments.

Furthermore, the program read out from the storage medium is written in a memory that is provided to a function expansion board inserted in the computer or a function expansion unit connected to the computer. Then, a CPU or the like provided to the function expansion board or the function expansion unit performs a part or all of the actual processing in accordance with an instruction of the program, and the processing also realizes the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

According to the embodiments of the present invention, the data related to the print data sent from the server apparatus to the print apparatus is transferred to the client terminal apparatus. Therefore, when the printing is performed based on the print data generated by the server apparatus and the client terminal apparatus in collaboration with each other, it is possible to notify the user of the client terminal apparatus of the information related to the printing.

This application claims the benefit of Japanese Application No. 2007-269346 filed Oct. 16, 2007, which is hereby incorporated by reference herein in its entirety.

What is claimed is:

1. A server apparatus comprising:
a driver configured to convert data transmitted from a client into print data that can be processed by a printer; and
a spooler, wherein the spooler comprises a management table for managing the print data converted by the driver in a manner that the print data is associated with the client that has transmitted the print data,
wherein the server apparatus determines whether or not the print data has been created by the client when a message needs to be displayed for processing of the print data converted by the driver, and adds to the print data first additional data including message information and error information in a case where the print data has been created by the client, and displays the message information in a case where the print data has not been created by the client,
wherein the spooler sends to the printer the print data which has been converted by the driver and the added first additional data including the message information and the error information,
wherein the printer sends to the spooler message information for identifying the client and the print data in a case where the printer processes the print data with the first additional data including the message information and the error information, and wherein the spooler identifies the client based on the management table and the message information received from the printer and sends the message information to the identified client.

2. The server apparatus according to claim 1,
wherein the printer stores the received print data,
wherein the client generates second additional data based on the message information received from the server apparatus and sends the second additional data to the printer, and
wherein the printer performs printing based on the stored print data and the second additional data.

3. A method comprising:
converting data transmitted from a client into print data that can be processed by a printer;
determining whether or not the print data has been created by the client when a message needs to be displayed for processing of the print data, adding to the print data first additional data including message information and error information in a case where the print data has been created by the client, and displaying the message information in a case where the print data has not been created by the client;
sending to the printer the print data and the added first additional data including the message information and the error information;
receiving from the printer message information for identifying the client and the print data in a case where the printer processes the print data with the first additional data including the message information and the error information; and
identifying the client based on a management table and the message information received from the printer and sending the message information to the identified client,
wherein the management table stores the print data and associates the print data with the client that has transmitted the print data.

4. The method according to claim 3, further comprising:
storing the received print data at the printer;
generating at the client second additional data based on the message information; and
sending the second additional data to the printer,
wherein the printer performs printing based on the stored print data and the second additional data.

5. One or more non-transitory computer-readable media storing instructions that, when executed by one or more computing devices, cause the one or more computing devices to perform operations comprising:
converting data transmitted from a client into print data that can be processed by a printer;
determining whether or not the print data has been created by the client when a message needs to be displayed for processing of the print data, and adding to the print data first additional data including message information and error information in a case where the print data has been created by the client, and displaying the message information in a case where the print data has not been created by the client;
sending to the printer the print data and the added first additional data including the message information and the error information;
receiving from the printer message information for identifying the client and the print data in a case where the printer processes the print data with the first additional data including the message information and the error information; and identifying the client based on the management table and the message information received from the printer and sending the message information to the identified client, wherein the management table stores the print data and associates the print data with the client that has transmitted the print data.

6. The one or more non-transitory computer-readable media according to claim 5, wherein the operations further comprise:

generating second additional data based on the message information received from the server apparatus and sending the second additional data to the printer, wherein the printer stores the received print data, and wherein the printer performs printing based on the stored print data and the second additional data.

\* \* \* \* \*